2 Sheets—Sheet 1.

E. T. COVELL.

METAL CAN.

No. 6,944. Reissued Feb. 22, 1876.

Witnesses
W. L. Bennem.
W. H. Isaacs.

Inventor
Edward T. Covell
by his atty.
Henry L. Brewood

N. PETERS, PHOTO-LITHOGRAPHER, WASHINGTON, D. C.

2 Sheets—Sheet 2.

E. T. COVELL.

METAL CAN.

No. 6,944. Reissued Feb. 22, 1876.

Witnesses
W. H. Isaacs.
W. L. Benham.

Inventor
Edward T. Covell
by his atty.
Henry L. Brewood

N. PETERS, PHOTO-LITHOGRAPHER, WASHINGTON, D. C.

UNITED STATES PATENT OFFICE

EDWARD T. COVELL, OF NEW BEDFORD, MASSACHUSETTS.

IMPROVEMENT IN METAL CANS.

Specification forming part of Letters Patent No. 42,351, dated April 19, 1864; reissue No. 6,944, dated February 22, 1876; application filed January 20, 1876.

*To all whom it may concern:*

Be it known that I, EDWARD T. COVELL, of New Bedford, Massachusetts, have invented certain new and useful Improvements in the Construction of Sheet-Metal Cans, such as are used for preserving fruits, vegetables, &c., and for other purposes; and I do hereby declare the following to be a full, clear, and exact description thereof, reference being had to the accompanying drawings, forming a part of this specification, of which—

Figure 1:
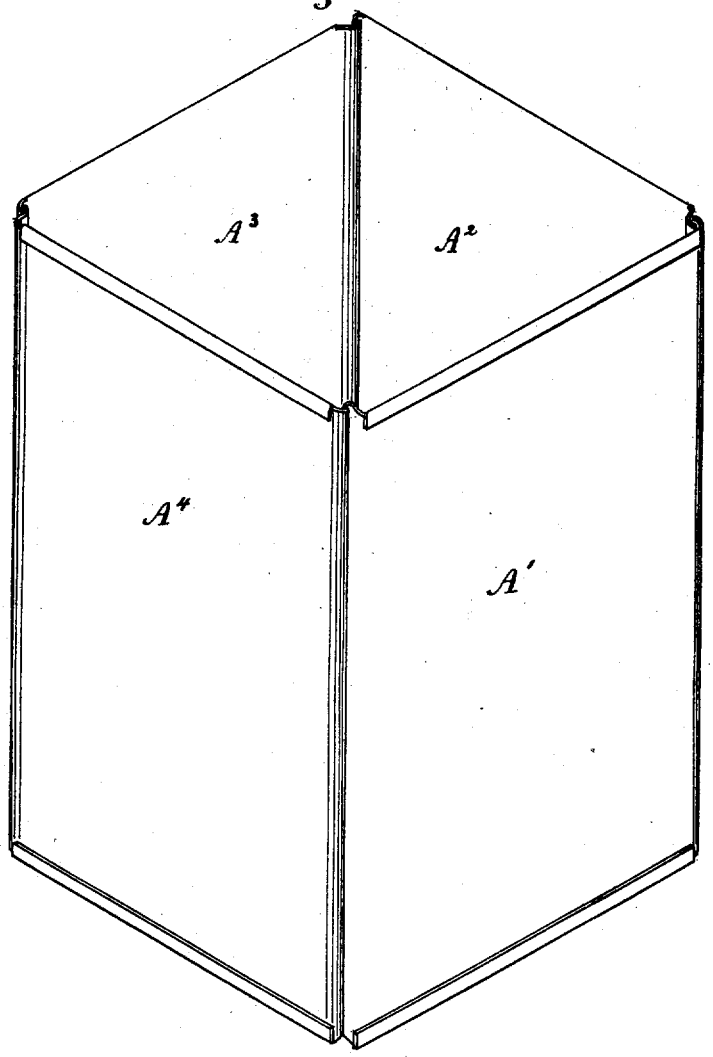
Figure 2:
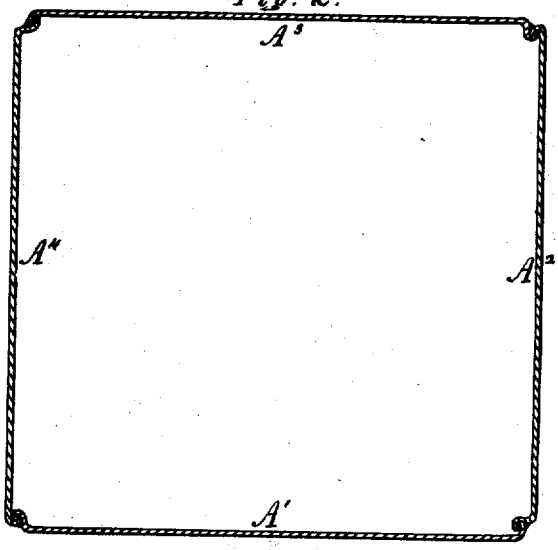
Figure 3:
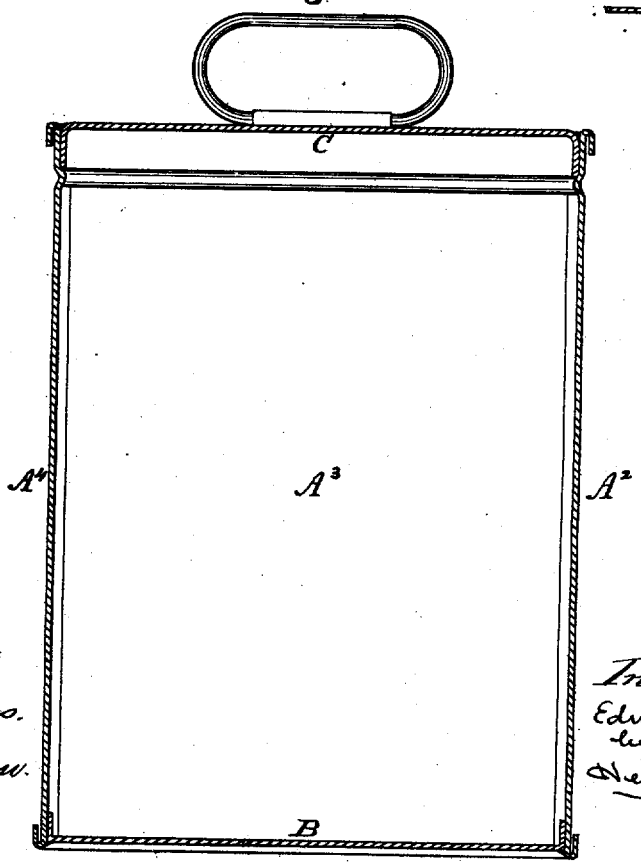

Figure 1 is a perspective view of one of my improved cans with its top off; Fig. 2, a transverse section of the same; Fig. 3, a vertical section of the same with its top in place; and Fig. 4, a vertical section of a part of the bottom and one side of one of my improved cans, showing a mode of securing the bottom therein, differing somewhat from that illustrated in Fig. 3.

Similar letters of reference indicate like parts in all of the figures.

The object of my invention is to afford a simple, expeditious, and cheap mode of uniting with each other the sides and ends of a sheet-metal can, and by the employment of this mode to produce a neat and strong can.

Heretofore, in the construction of such a can as is illustrated in the accompanying drawings, the usual process has been to lap the margins of two opposite sides, such as $A^1$ and $A^3$, around the edges of the other two sides, and to complete the joints by turning a seam of solder over each one and in the surface of the can, after which the end sheets, which are made larger than the transverse area of the can, are placed in position, and their margins lapped over upon the outside of the can, and also soldered. The can as thus constructed is not only unsightly, and not very strong, but it also requires great skill and care in its construction, as, the edges of the sheets of metal being exposed to immediate contact with the soldering-iron, the solder, unless run in very quickly and skillfully, is apt to penetrate unequally under the edges and "cockle" them, thus forming an irregular and clumsy joint. I overcome these difficulties and objections by forming the joints of the cans as illustrated in the accompanying drawings, the formation of the sheets composing the sides of the can being most clearly shown by Figs. 1 and 2, wherein it appears that one margin of these sheets is bent inwardly until it reaches a position approximating to a right angle with the sheet, while the opposite margin thereof is bent into such a form as that its transverse section is somewhat similar to the letter "Z" or figure "2." These sheets, being so bent, are placed in such positions relatively to each other as that each simple bend of the sheets may be received into, and in a degree embraced by, the compound bend of the next adjacent sheet, and being in this position it will be observed that a gutter or groove is formed at each angle of the can, down which the soldering-iron may be guided with ease and accuracy by even an inexperienced hand, and as the edges of the sheets are not exposed to direct contact with the iron the liability of "cockling" the edges is overcome.

Figure 4:
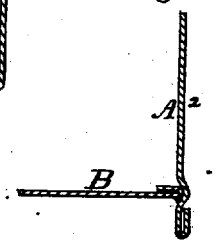

The heads may be secured in the can by simply turning up a flange on each edge thereof, and inside of the can, after which they are soldered securely on the outside of the joint; or they may be secured in the manner represented in Fig. 4. Here a groove is formed on the inner face of each side of the can, and before the sides are soldered together the heads, previously prepared of a proper size, and hemmed, if desired, are placed in such a position that each edge thereof is received into one of the grooves, after which the whole is soldered together. The side plates of the can may with advantage be hemmed at top and bottom.

I am aware that the joints of sheet-metal cans have been made by turning in the margins of the plates at suitable angles, and soldering together the outer faces of these turned-in margins; but it will be readily perceived that the joints constructed upon my plan are much stronger than these, and have the additional advantage of being free from those inwardly-projecting sharp ribs which are found in cans constructed as above described, and which are liable to injure the contents of the can. I am also aware that hooked joints have

BEST AVAILABLE COPY been employed for uniting the bottom or head with the sides of the can, which hooked joints were similar to mine, except that they were formed outward and upon the outside of the can, and not inward and upon the inside, which latter position, besides the advantage of adding strength to the can by reason of the character of the joint, has the advantage of protecting the side seams or joints from damage by contact with other articles.

My improved cans are more easily constructed than those made on other plans, as, from the peculiar formation of the several plates, each is, in a measure, tied in place by the two next adjacent ones, even before the solder is applied.

Having thus fully described my improved manner of constructing sheet-metal cans, what I claim as my invention, and desire to secure by Letters Patent, is—

Uniting the sides of sheet-metal cans by means of interlocking hook-shaped flanges and solder, substantially as herein set forth, when such hooked-shaped flanges are formed and turned upon the inside of the can, substantially as herein set forth.

EDWARD T. COVELL.

Witnesses:
HENRY L. BREEVOORT,
J. HENRY TAYLOR.